US010067536B1

(12) United States Patent
Watamura

(10) Patent No.: US 10,067,536 B1
(45) Date of Patent: Sep. 4, 2018

(54) PORTABLE INFORMATION DEVICE

(71) Applicant: LENOVO (SINGAPORE) PTE. LTD., Singapore (SG)

(72) Inventor: Kenji Watamura, Yokohama (JP)

(73) Assignee: LENOVO (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 15/850,327

(22) Filed: Dec. 21, 2017

(30) Foreign Application Priority Data

Oct. 4, 2017 (JP) ................................ 2017-194112

(51) Int. Cl.
*G06F 1/16* (2006.01)
*E05D 3/14* (2006.01)
*H04B 1/3827* (2015.01)

(52) U.S. Cl.
CPC ............. *G06F 1/1652* (2013.01); *E05D 3/14* (2013.01); *G06F 1/1626* (2013.01); *G06F 1/1681* (2013.01); *E05Y 2900/606* (2013.01); *H04B 1/3827* (2013.01)

(58) Field of Classification Search
CPC ..... G06F 1/1641; G06F 1/1647; G06F 1/1652
See application file for complete search history.

(56) References Cited

U.S. PATENT DOCUMENTS

| | | | | |
|---|---|---|---|---|
| 8,727,601 | B2* | 5/2014 | Wang | G09F 9/301 361/679.01 |
| 2012/0120618 | A1* | 5/2012 | Bohn | G06F 1/1618 361/749 |
| 2015/0055287 | A1* | 2/2015 | Seo | G06F 1/1652 361/679.27 |
| 2016/0085268 | A1* | 3/2016 | Aurongzeb | G06F 1/1677 345/156 |
| 2016/0205792 | A1* | 7/2016 | Ahn | H05K 5/0017 40/779 |
| 2016/0216737 | A1* | 7/2016 | Hayk | G06F 1/1652 |
| 2016/0334836 | A1* | 11/2016 | Hong | G06F 1/1616 |
| 2016/0378203 | A1* | 12/2016 | Kim | G06F 1/1616 345/156 |
| 2018/0032108 | A1* | 2/2018 | Park | G06F 1/1656 |
| 2018/0077810 | A1* | 3/2018 | Moon | G06F 1/1618 |

FOREIGN PATENT DOCUMENTS

JP 2014216025 A 11/2014

* cited by examiner

*Primary Examiner* — Anthony Q Edwards
(74) *Attorney, Agent, or Firm* — Shimokaji IP

(57) ABSTRACT

A portable information device is capable of stably supporting a foldable display. The portable information device has a first engagement piece which is provided in a first support plate, projects from the inner end surface side of the first support plate, and contacts/separates from a second support plate when a first chassis member and a second chassis member are opened/closed, and a second engagement piece which is provided in the second support plate, projects from the inner end surface side of the second support plate, and contacts/separates from the first support plate when the first chassis member and the second chassis member are opened/closed.

7 Claims, 10 Drawing Sheets

PORTABLE INFORMATION DEVICE

FIELD OF THE INVENTION

The present invention relates to a portable information device in which a foldable display is provided inside a pair of foldable chassis members.

BACKGROUND OF THE INVENTION

In recent years, portable information devices, such as a tablet PC and a smartphone having a touch panel type liquid crystal display and not having a physical keyboard, have rapidly spread. The display of this kind of portable information device has been desired to be large in use but has been desired to be miniaturized in carrying. Then, a portable information device has been proposed in which not only a chassis but a display is configured so as to be foldable by the use of a flexible displays, such as organic EL (Electro Luminescence) (for example, see Patent Document 1).

[Patent Document 1] Japanese Patent Application Laid-Open No. 2014-216025

SUMMARY OF THE INVENTION

The flexible display described above is very thin and vulnerable to impact and the like. Therefore, the flexible display needs to be stably supported on the inner surface side of the chassis member which is movable to be double-folded. Then, it is considered to provide a support member for supporting the flexible display on the inner surface side of the chassis member, for example. However, the support member also needs to be movable to be double-folded. When a level difference or the like is generated in the folded portion, there is a possibility that the display is curved to cause product defects.

The present invention has been made considering the above-described problems of the former technique. It is an object of the present invention to provide a portable information device in which a foldable display can be stably supported.

A portable information device according to one aspect of the present invention has a first chassis member and a second chassis member which are foldable into a double-folded state, a display which is provided over the inner surfaces of the first chassis member and the second chassis member and which is foldable into a double-folded state, a first support plate which is disposed on the inner surface side of the first chassis member and supports the rear surface of the display on the side of the first chassis member, a second support plate which is disposed on the inner surface side of the second chassis member and supports the rear surface of the display on the side of the second chassis member, a first engagement piece which is provided in the first support plate, projects from one end surface side of the first support plate, and contacts/separates from the second support plate when the first chassis member and the second chassis member are opened/closed, and a second engagement piece which is provided in the second support plate, projects from one end surface side of the second support plate, and contacts/separates from the first support plate when the first chassis member and the second chassis member are opened/closed.

According to such a configuration, the engagement pieces projecting from the support plates abut on the mating support plates. Thus, when the chassis members are opened into a flat plate shape, the engagement pieces abutting on the support plates regulate each other to be balanced, so that the two support plates are formed flat. Thus, the portable information device can stably support the display while preventing the generation of a level difference between one end surfaces facing each other of the support plates.

The portable information device may be configured so that two or more of the first engagement pieces are provided along one end surface of the first support plate and two or more of the second engagement pieces are provided along one end surface of the second support plate at positions where the first engagement pieces and the second engagement pieces alternately face each other. Thus, the generation of a level difference in a direction along the one end surface of each support plate can be more certainly prevented.

The portable information device may be configured so that the base end side of the first engagement piece is provided on the rear surface side of the first support plate, and the base end side of the second engagement piece is provided on the rear surface side of the second support plate and, in a state where the first chassis member and the second chassis member are opened into a flat plate shape, the surface on the tip end side of the first engagement piece abuts on the rear surface of the second support plate or the bottom surface of a recessed portion formed in the rear surface, and the surface on the tip end side of the second engagement piece abuts on the rear surface of the first support plate or the bottom surface of a recessed portion formed in the rear surface.

The portable information device may be configured so that the first engagement piece projects from one end surface of the first support plate, the second engagement piece projects from one end surface of the second support plate, and, in a state where the first chassis member and the second chassis member are opened into a flat plate shape, the surface on the tip end side of the first engagement piece abuts on the bottom surface of a recessed portion formed in the rear surface of the second support plate or the top surface of a hole portion opened and formed in one end surface of the second support plate, and the surface on the tip end side of the second engagement piece abuts on the bottom surface of the recessed portion formed in the rear surface of the first support plate or the top surface of a hole portion opened and formed in one end surface of the first support plate.

The portable information device may be configured so that, in the state where the first chassis member and the second chassis member are opened into the flat plate shape, one end surface of the first support plate may be disposed abutting on one end surface of the second support plate. Thus, the display is more stably supported by the support plates, the rear surfaces of which are configured into a one plate shape without a level difference.

The portable information device may be configured so that the first chassis member and the second chassis member are foldable into a double-folded state by connection of a pair of edge portions disposed adjacent to each other by a hinge mechanism, and the hinge mechanism has a first hinge chassis which is fixed to the inner surface of the first chassis member and on the surface of which the first support plate is supported, a second hinge chassis which is fixed to the inner surface of the second chassis member and on the surface of which the second support plate is supported, and a hinge shaft rotatably connecting the first hinge chassis and the second hinge chassis. Thus, both end portions of each support plate are supported by the hinge mechanisms provided on both end portions in a direction along one end surface of each support plate, for example, and therefore the generation of a level difference in the direction along one end surface of each support plate can be more certainly prevented.

The portable information device may be configured so that the first chassis member and the second chassis member are foldable into a double-folded state by connection of a pair of edge portions disposed adjacent to each other by a hinge mechanism, and the hinge mechanism has a first link member and a second link member provided throughout between the inner surfaces of the first chassis member and the second chassis member, one end side of the first link member is rotatably connected to the first chassis member through a first hinge shaft and the other end side thereof is rotatably connected to the second chassis member through a second hinge shaft, one end side of the second first link member is rotatably connected to the first chassis member through a third hinge shaft and the other end side thereof is rotatably connected to the second chassis member through a fourth hinge shaft, and the first hinge shaft, the second hinge shaft, the third hinge shaft, and the fourth hinge shaft are disposed side by side in the order of the first hinge shaft, the third hinge shaft, the second hinge shaft, and the fourth hinge shaft in a direction from the first chassis member to the second chassis member. Thus, when the chassis members are opened from a closed state, for example, one end surfaces of the support plates contact/separate from each other substantially in the horizontal direction, and therefore each engagement piece can be caused to contact/separate from the mating support plate from the rear surface more smoothly and without interfering with each other.

The above-described aspects of the present invention can provide a portable information device capable of stably supporting a foldable display.

DETAILED DESCRIPTION OF THE INVENTION

Hereinafter, preferable embodiments of a portable information device according to the present invention are described in detail with reference to the attached drawings.

1. Description of Entire Configuration of Portable Information Device

Figure 1:
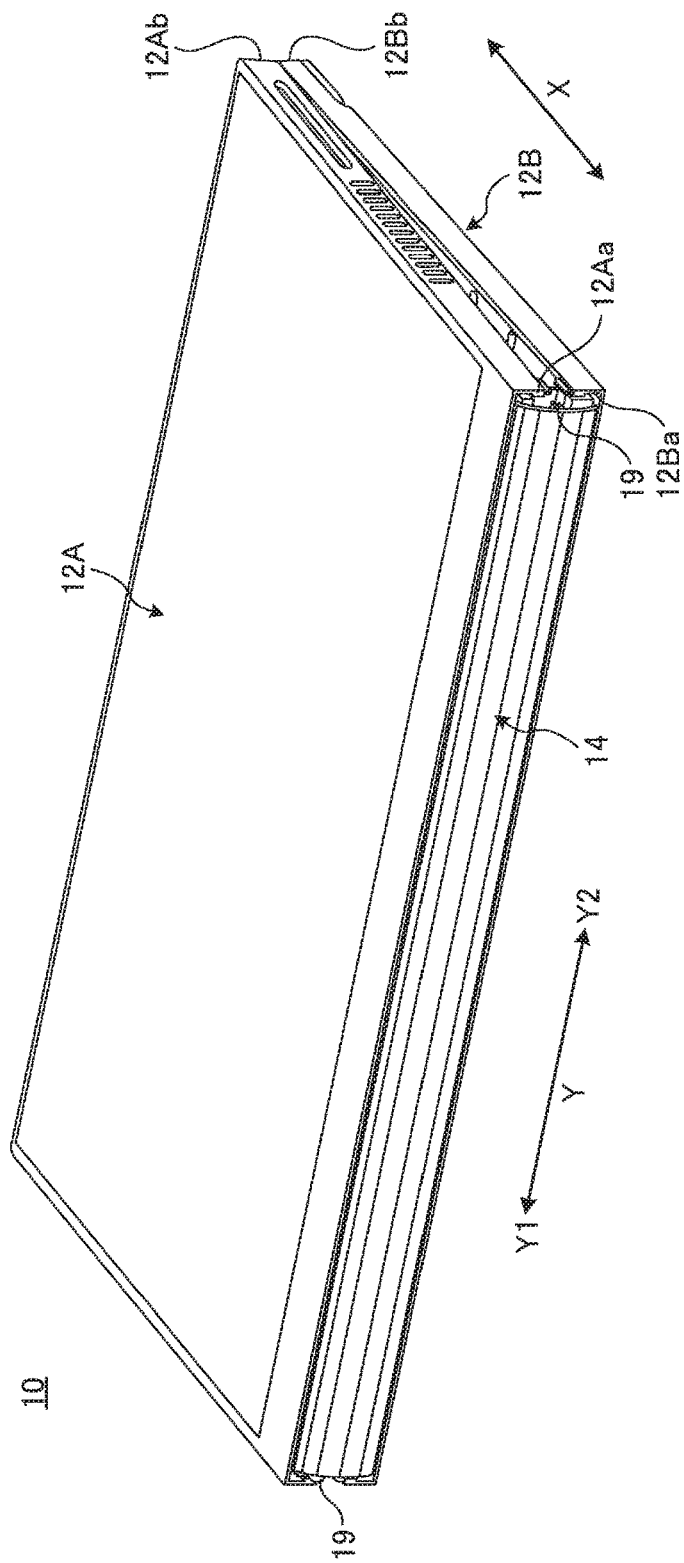
FIG. 1 is a perspective view illustrating a state where a portable information device according to one embodiment of the present invention is closed into a storage form.
Figure 2:
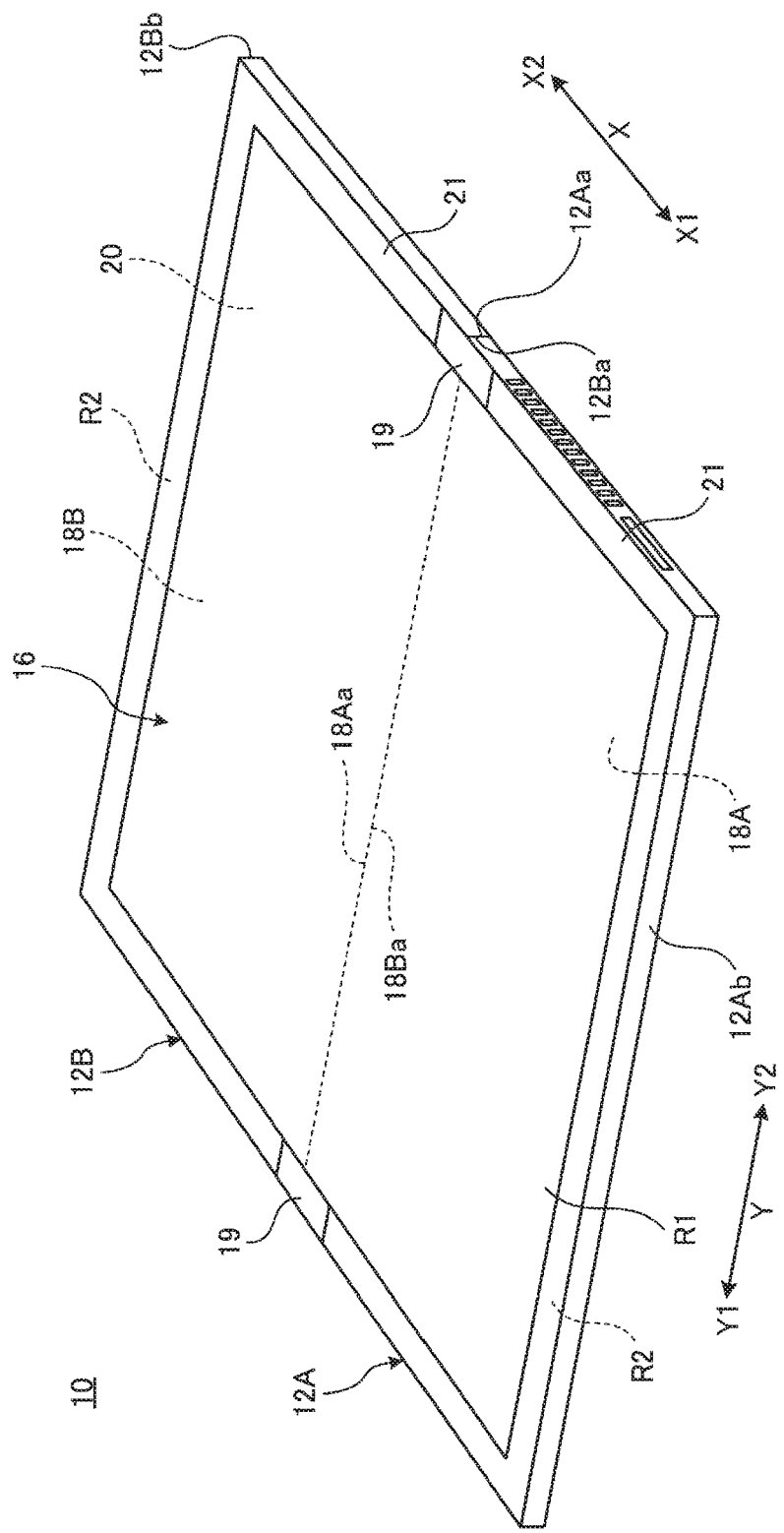
FIG. 2 is a perspective view schematically illustrating a state where the portable information device illustrated in FIG. 1 is opened into a usage form.
Figure 3:
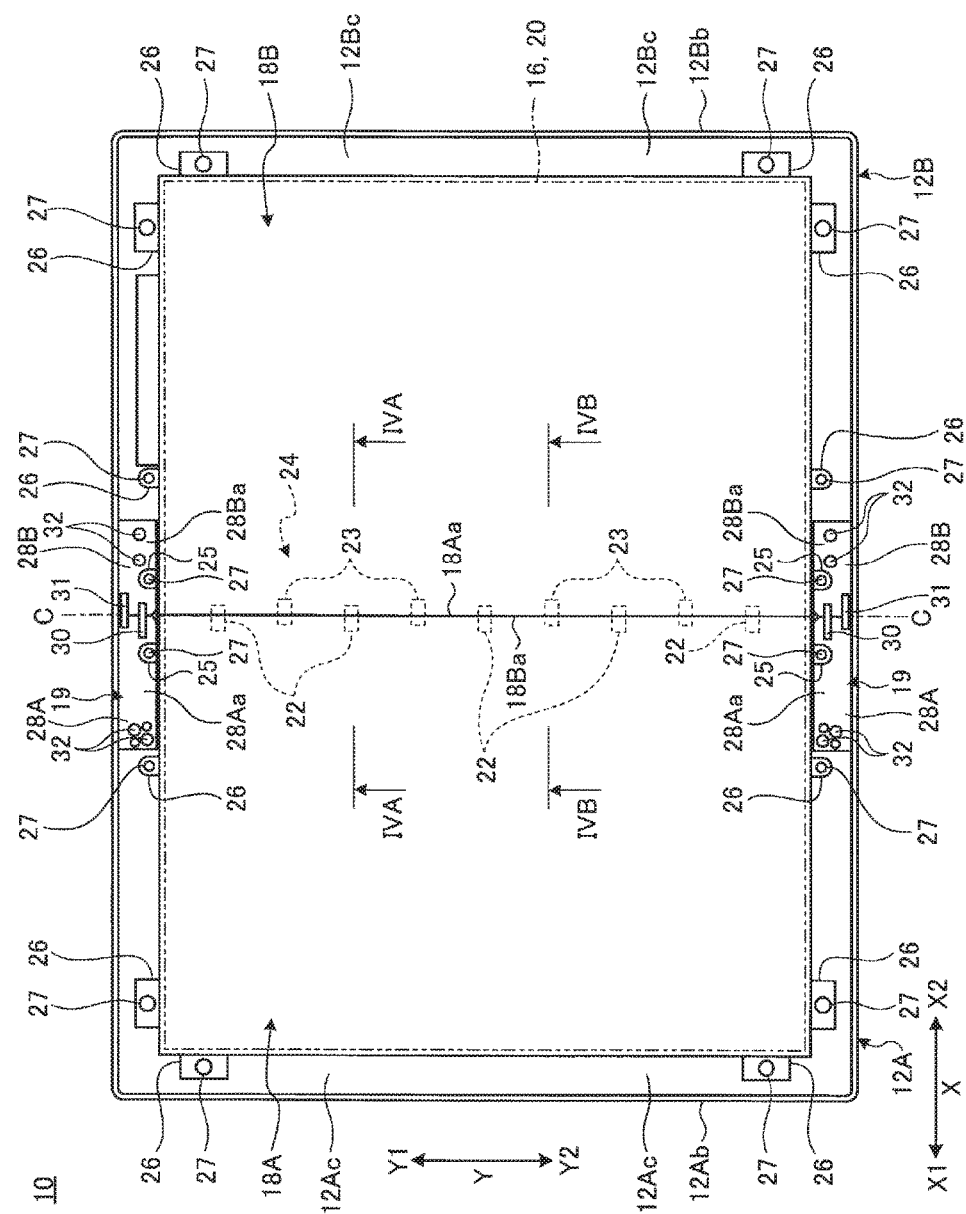
FIG. 3 is a plan view schematically illustrating the internal structure of the portable information device illustrated in FIG. 2.

FIG. 1 is a perspective view illustrating a state where a portable information device 10, according to one embodiment of the present invention, is closed into a storage form. FIG. 2 is a perspective view schematically illustrating a state where the portable information device 10 illustrated in FIG. 1 is opened into a usage form. FIG. 3 is a plan view schematically illustrating the internal structure of the portable information device 10 illustrated in FIG. 2.

As illustrated in FIG. 1 and FIG. 2, the portable information device 10 has a first chassis member 12A, a second chassis member 12B, a backbone member 14, and a display 16. In this embodiment, a tablet PC which is foldable into a double-folded state like a book is described as an example of the portable information device 10. The portable information device 10 may be a cellular phone, a smartphone, an electronic notebook, a portable game machine, or the like.

The chassis members 12A and 12B each are rectangular plate-like members in which the side walls are formed so as to be raised on three sides other than the side corresponding to the backbone member 14. The chassis members 12A and 12B each contain metal plates of stainless steel, magnesium, and aluminum, fiber reinforced resin plates containing reinforced fibers, such as carbon fibers, and the like, for example. To the inner surface sides of the chassis members 12A and 12B, a display 16 is fixed through a first support plate 18A and a second support plate 18B. The chassis members 12A and 12B are connected through a pair of hinge mechanisms 19 and 19 provided on both end portions of the backbone member 14. The hinge mechanisms 19 connect the chassis members 12A and 12B so as to be foldable into a storage form illustrated in FIG. 1 and a usage form illustrated in FIG. 2. A line C illustrated by the dashed line in FIG. 3 represents a folding center C serving as the center of a folding operation of the chassis members 12A and 12B.

In the chassis members 12A and 12B, inner end surfaces (one end surface) 12Aa and 12Ba on the side of the backbone member 14 serve as the hinge sides, and outer end surface 12Ab and 12Bb on the side opposite to the backbone member 14 serve as open end portion sides.

Hereinafter, the portable information device 10 is described defining a direction from the backbone member 14 at the center to the outer end surfaces 12Ab and 12Bb as an X direction and a direction along the longitudinal direction of the backbone member 14 as a Y direction as illustrated in FIG. 1 to FIG. 3. With respect to the X direction, a direction from the backbone member 14 to the one outer end surface 12Ab is sometimes referred to as an X1 direction and a direction from the backbone member 14 to the other outer end surface 12Bb is sometimes referred to as an X2 direction. Similarly, with respect to the Y direction, a direction to one side (upper side in FIG. 3) in the longitudinal direction of the backbone member 14 is sometimes referred to as a Y1 direction and a direction to the other side (lower side in FIG. 3) is sometimes referred to as a Y2 direction.

As illustrated in FIG. 2 and FIG. 3, the first support plate 18A is attached and fixed to an inner surface 12Ac of the first chassis member 12A, and the second support plate 18B is attached and fixed to an inner surface 12Bc of the second chassis member 12B. To positions on the inner surfaces 12Ac and 12Bc of the chassis members 12A and 12B and on the rear surface sides of the support plates 18A and 18B, various kinds of parts, such as a substrate, a communication module, a battery device, and a cooling device, are attached and fixed.

The display 16 is a touch panel type liquid crystal display, for example. The display 16 is configured so as to be foldable together with the chassis members 12A and 12B when the chassis members 12A and 12B are folded. The display 16 is attached and fixed to the side of the inner surfaces 12Ac and 12Bc of the chassis members 12A and 12B through the support plates 18A and 18B. The display 16 is a flexible display, such as an organic EL having a paper structure having high flexibility, for example and are opened/closed with an opening/closing operation of the chassis members 12A and 12B.

The backbone member 14 is formed of a thin plate-like member having flexibility and serves as the backbone in folding the portable information device 10. The backbone member 14 is provided throughout between the chassis member 12A and 12B so as to cover the inner end surfaces 12Aa and 12Ba from the inner side. As illustrated in FIG. 1, in the portable information device 10, the inner end surfaces 12Aa and 12Ba of the chassis members 12A and 12B greatly separate from each other to form a gap in the storage form. The backbone member 14 covers the gap between the inner end surface 12Aa and 12Ba to thereby prevent the display 16 and various kinds of parts provided inside from being exposed.

2. Description of Support Plate

Figure 4A:
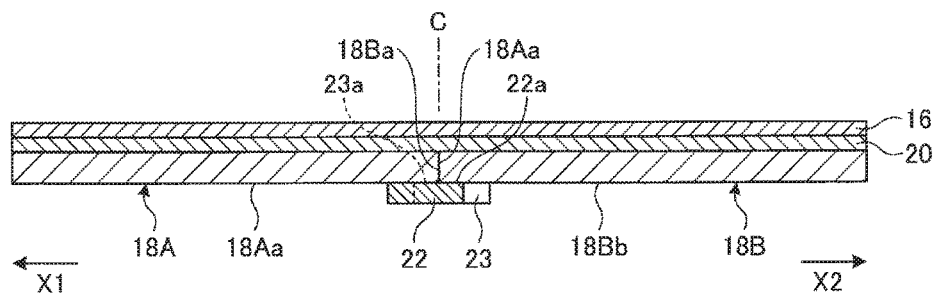
FIG. 4A is a schematic cross sectional view along the IVA-IVA line in FIG. 3.
Figure 4B:
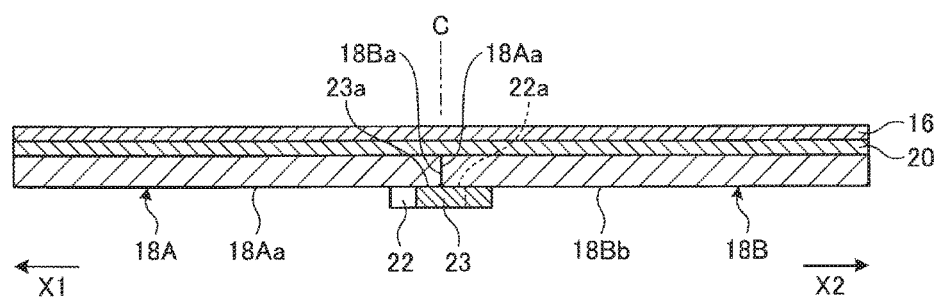
FIG. 4B is a schematic cross sectional view along the IVB-IVB line in FIG. 3.

A configuration example of the support plates 18A and 18B supporting the display 16 is described. FIG. 4A is a schematic cross sectional view along the IVA-IVA line in FIG. 3. FIG. 4B is a schematic cross sectional view along the IVB-IVB line in FIG. 3.

As illustrated in FIG. 4A and FIG. 4B, the support plates 18A and 18B are plate members supporting the display 16 on the surface side thereof. The support plates 18A and 18B are fixed to the inner surfaces 12Ac and 12Bc of the chassis members 12A and 12B, respectively, and are opened/closed like a book centering on the folding center C. In the case of this embodiment, the support plates 18A and 18B support the display 16 through a sheet-like member 20.

The support plates 18A and 18B contain metal plates of stainless steel, magnesium, and aluminum, fiber reinforced resin plates in which a matrix resin containing a thermosetting resin or a thermoplastic resin is impregnated with reinforced fibers, such as carbon fibers, and the like, for example. In this embodiment, the support plates 18A and 18B are formed of carbon fiber reinforced resin plates containing carbon fibers as a reinforced resin. In the support plates 18A and 18B of this embodiment, inner end surfaces (one end surface) 18Aa and 18Ba adjacent to each other abut on each other in the usage form in which the chassis members 12A and 12B are opened into a flat plate shape (see FIG. 4A and FIG. 6A). In the support plates 18A and 18B, in the storage form in which the chassis members 12A and 12B are forded into a double-folded state, the inner end surface 18Aa and 18Ba separate from each other (see FIG. 6C).

The sheet-like member 20 is a thin film containing a material having flexibility, such as a thin resin film or metallic foil. The sheet-like member 20 is disposed on the entire surface over the support plates 18A and 18B on the right and left sides. The rear surface of the sheet-like member 20 is pasted and fixed to the surfaces of the support plates 18A and 18B using an adhesive, a double-sided tape, or the like. In the sheet-like member 20, a portion straddling the inner end surfaces 18Aa and 18Ba in the X direction (beltlike portion in which the side in the X direction is the short side and the side in the Y direction is the long side) serves as a non-adhesion portion which is not caused to adhere to the surface of the support plates 18A and 18B (see FIG. 6C). In the sheet-like member 20, the non-adhesion portion functions as a folding portion (flexible hinge) between the support plates 18A and 18B.

Almost the entire region of the rear surface of the display 16 is pasted and fixed to the surface of the sheet-like member 20 using an adhesive, a double-sided tape, or the like. As illustrated in FIG. 2, a bezel member 21 is disposed on the outer peripheral edge of the surface of the display 16. The bezel member 21 is provided so as to cover a non-displaying region (inactive region) R2 of the outer peripheral edge excluding a display region (active region) R1 of the surface of the display 16. The display 16 may be directly pasted and fixed to the surfaces of the support plates 18A and 18B not using the sheet-like member 20. In the case of the configuration, the portion straddling the inner end surfaces 18Aa and 18Ba in the X direction of the display 16 serves as a non-adhesion portion which is not caused to adhere to the support plates 18A and 18B.

As illustrated in FIG. 3, an inter-end surface positioning portion 24 having a plurality of first engagement pieces 22 and second engagement pieces 23 is provided between the inner end surfaces 18Aa and 18Ba of the support plates 18A and 18B.

Figure 5:
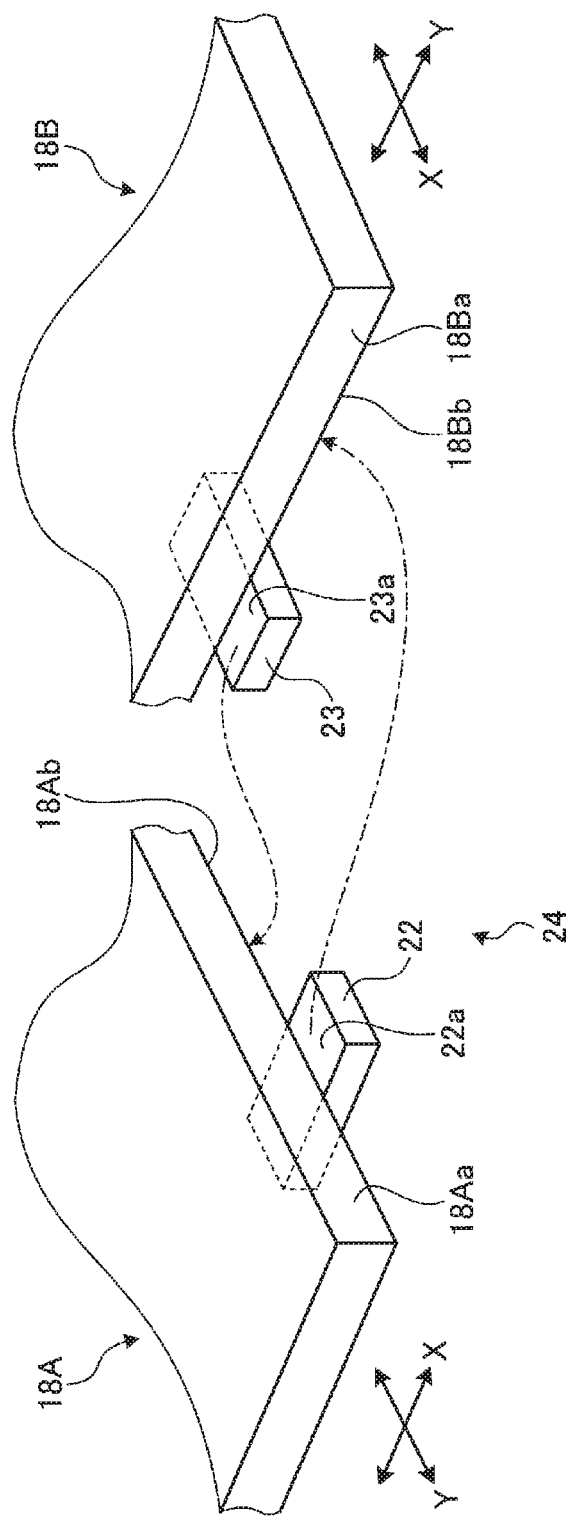
FIG. 5 is an enlarged perspective view of an essential portion schematically illustrating the configuration of an inter-end surface positioning portion.

FIG. 5 is an enlarged perspective view of an essential portion schematically illustrating the configuration of the inter-end surface positioning portion 24. FIG. 5 is an explanatory view in which the inner end surface 18Aa of the first support plate 18A and the inner end surface 18Ba of the second support plate 18B are developed into a fan shape.

As illustrated in FIG. 3 to FIG. 5, the first engagement piece 22 is a plate piece-like member fixed to the rear surface 18Ab of the first support plate 18A. Two or more of the first engagement pieces 22 (5 pieces in FIG. 3) are disposed side by side at predetermined intervals along the inner end surface 18Aa of the first support plate 18A. The base end side of the first engagement pieces 22 is integrally formed with the rear surface 18Ab or bonded and fixed to the rear surface 18Ab using an adhesive or a double-sided tape. The tip end side of the first engagement pieces 22 projects in the X2 direction straddling the inner end surfaces 18Aa and 18Ba to extend to a position where the tip end side of the first engagement pieces 22 can abut on the rear surface 18Bb of the second support plate 18B. In the first engagement pieces 22, when the chassis members 12A and 12B are opened/closed by the hinge mechanisms 19, a surface 22*a* on the tip side projecting from the inner end surface 18Aa contacts/separates from the rear surface 18Bb of the second support plate 18B from the rear surface 18Bb side.

The second engagement piece 23 is a plate piece-like member fixed to the rear surface 18Bb of the second support plate 18B. Two or more of the second engagement pieces 23 (4 pieces in FIG. 3) are disposed side by side at predetermined intervals along the inner end surface 18Ba of the second support plate 18B and are disposed so as to be present between the first engagement pieces 22 and 22 adjacent to each other. The base end side of the second engagement pieces 23 is integrally formed with the rear surface 18Bb or bonded and fixed to the rear surface 18Bb using an adhesive or a double-sided tape. The tip end side of the second engagement pieces 23 projects in the X1 direction straddling the inner end surfaces 18Ba and 18Aa to extend to a position where tip end side of the second engagement pieces 23 can abut on the rear surface 18Ab of the first support plate 18A. In the second engagement pieces 22, when the chassis members 12A and 12B are opened/closed by the hinge mechanisms 19, a surface 23$a$ on the tip side projecting from the inner end surface 18Ba contacts/separates from the rear surface 18Ab of the second support plate 18A from the rear surface 18Ab side.

Thus, the engagement pieces 22 and 23 are alternately disposed side by side in the Y direction and project in the opposite directions in the X direction to thereby build a structure in which the comb teeth are engaged with each other, with the inner end surface 18Aa and 18Ba interposed therebetween, and the surfaces 22$a$ and 23$a$ contact/separate from the rear surfaces 18Ab and 18Bb of the mating support plates 18A and 18B.

As illustrated in FIG. 3, the support plates 18A and 18B are attached and fixed to the inner surfaces 12Ac and 12Bc of the chassis members 12A and 12B through a plurality of attachment pieces 25 and 26 projecting from the outer peripheral edge thereof. The attachment pieces 25 and 26 are projection pieces projecting outwardly from the outer peripheral end surfaces of the support plates 18A and 18B. The attachment pieces 25 are provided at the positions overlapping with the hinge mechanisms 19. Two or more attachment pieces 26 are provided at appropriate positions of the outer peripheral edge portions of the support plates 18A and 18B. In the attachment pieces 25 and 26, a screwing through-hole is formed in the center. The support plates 18A and 18B are fastened and fixed to the inner surfaces 12Ac and 12Bc of the chassis members 12A and 12B by attachment screws 27 passing through the through-holes of the attachment pieces 25 and 26. Herein, the attachment pieces 25 are fastened by the attachment screws 27 to hinge chassis 28A and 28B described later in a state of being disposed abutting on the surfaces 28Aa and 28Ba of the hinge chassis 28A and 28B. In the inner surfaces 12Ac and 12Bc of the chassis members 12A and 12B, a boss provided with a female screw into which the attachment screw 27 is screwed may be provided.

3. Description of Hinge Mechanism

A configuration example of the hinge mechanisms 19 connecting the chassis members 12A and 12B is described. The hinge mechanism 19 may contain a monoaxial hinge or a biaxial hinge instead of the following multi-axis hinge.

As illustrated in FIG. 3, the hinge mechanisms 19 are disposed on both end portions in the Y direction in such a manner as to straddle the chassis members 12A and 12B. The hinge mechanisms 19 are disposed at positions on the outside of the outer shape of the display 16 and are structured to be linearly symmetrical with each other about the straight line in the X direction passing through the center in the Y direction. Each hinge mechanism 19 has the first hinge chassis 28A, the second hinge chassis 28B, a first link member 30, and a second link member 31.

The hinge chassis 28A and 28B are thin block-shaped parts formed of resin, metal, and the like. The first hinge chassis 28A is fixed onto the inner surface 12Ac of the first chassis member 12A using fixation screws 32. The second hinge chassis 28B is fixed onto the inner surface 12Bc of the second chassis member 12B using the fixation screws 32.

Figure 6A:
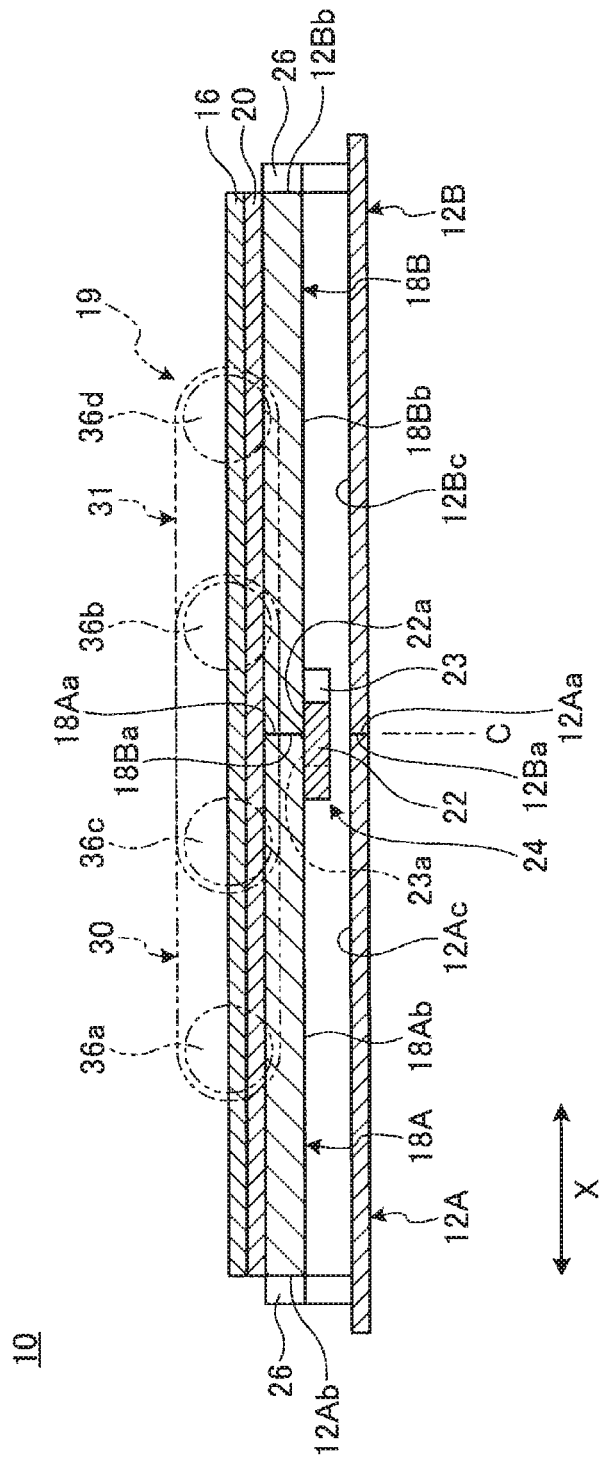
FIG. 6A is a side cross-sectional view schematically illustrating the positional relationship between the support plates and a hinge mechanism in a state where chassis members are opened.

One end portion of the first link member 30 is rotatably connected to the first hinge chassis 28A through a first hinge shaft 36$a$, and the other end portion thereof is rotatably connected to the second hinge chassis 28B through a second hinge shaft 36$b$ (see FIG. 6A). One end portion of the second link member 31 is rotatably connected to the first hinge chassis 28A through a third hinge shaft 36$c$, and the other end portion thereof is rotatably connected to the second hinge chassis 28B through a fourth hinge shaft 36$d$ (see FIG. 6A). The first link member 30 and the second link member 31 are arranged in parallel in the Y direction. The second hinge shaft 36$b$ of the first link member 30 is located at a position sandwiched between the third hinge shaft 36$c$ and the fourth hinge shaft 36$d$ of the second link member 31. The third hinge shaft 36$c$ of the second link member 31 is located at a position sandwiched between the first hinge shaft 36$a$ and the second hinge shaft 36$b$ of the first link member 30. Thus, the first link member 30 and the second link member 31 are alternately disposed side by side with positional deviation in the X direction and the Y direction.

Figure 6B:
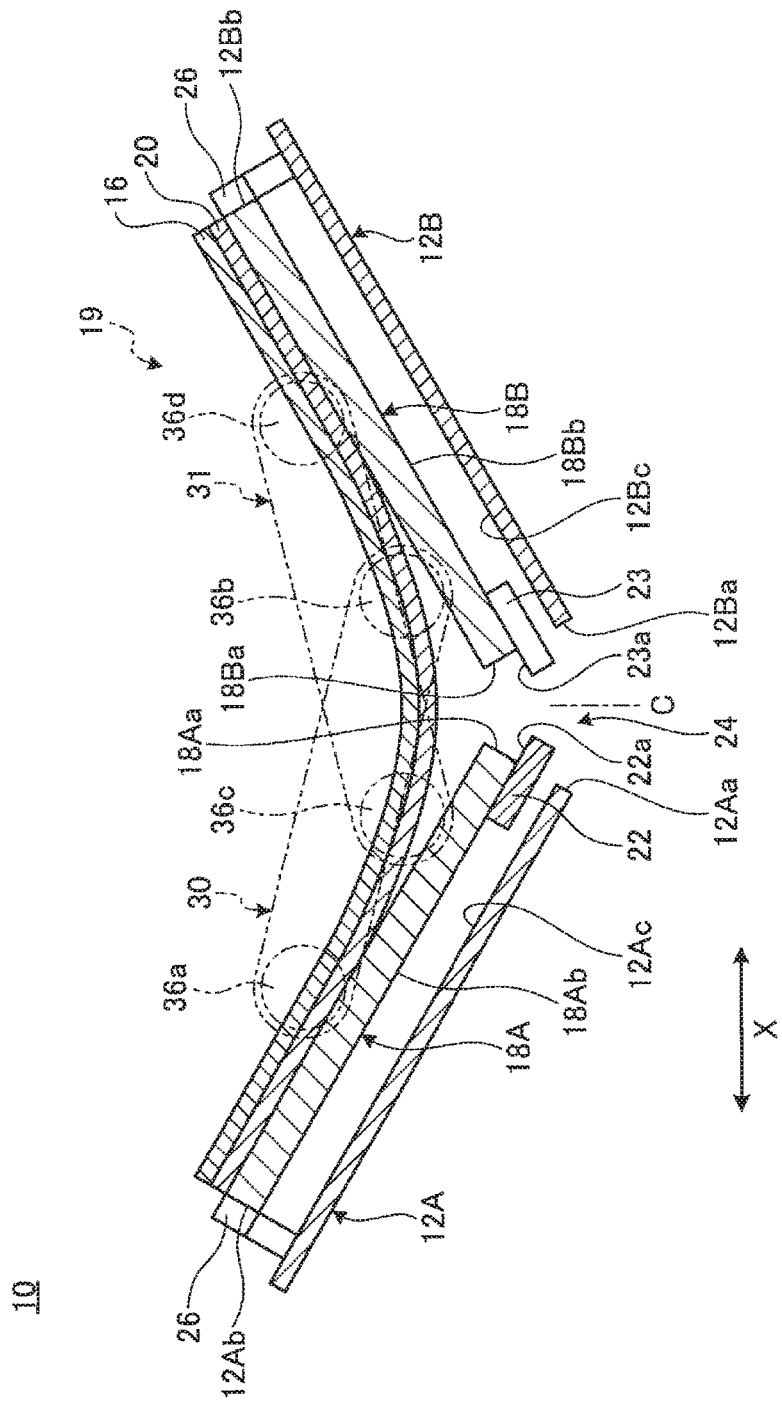
FIG. 6B is a side cross-sectional view in a state where the chassis members are operated so as to be closed from the state illustrated in FIG. 6A.
Figure 6C:
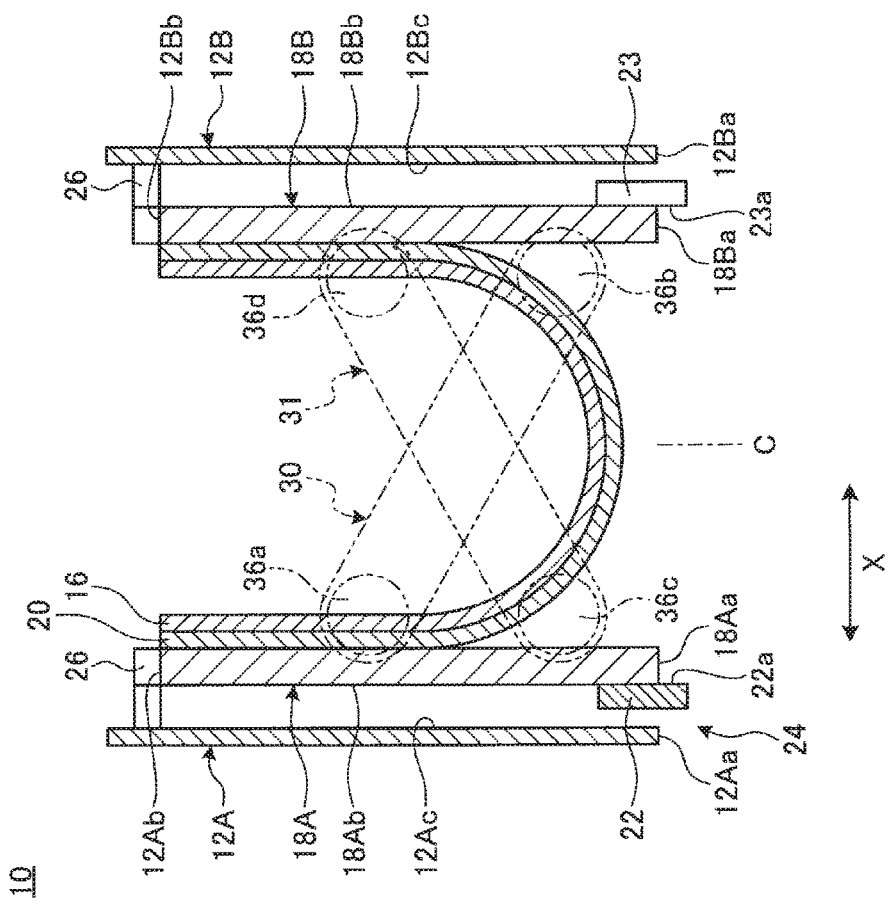
FIG. 6C is a side cross-sectional view in a state where the chassis members are operated so as to be closed from the state illustrated in FIG. 6B to be folded into a double-folded state.

With respect to the hinge mechanisms 19, when the chassis members 12A and 12B are folded centering on the folding center C, the link members 30 and 31 rotate through the hinge shafts 36$a$ to 36$d$ (see FIG. 6A to FIG. 6C). Thus, the hinge mechanisms 19 connect the chassis members 12A and 12B so as to be openable/closable from the state where the chassis members 12A and 12B are folded into the double-folded state to the state where the chassis members 12A and 12B are opened into the flat plate shape.

4. Description of Opening/Closing Operation and Operational Effects of Portable Information Device An opening/closing operation of the portable information device 10 is described. FIG. 6A is a side positional relationship between the support plates 18A and 18B and the hinge mechanisms 19 in a state where the chassis members 12A and 12B are opened. FIG. 6B is a side cross-sectional view in a state where the chassis members 12A and 12B are operated so as to be closed from the state illustrated in FIG. 6A. FIG. 6C is a side cross-sectional view in a state where the chassis members 12A and 12B are operated so as to be closed from the state illustrated in FIG. 6B to be folded into a double-folded state.

In the portable information device 10 of this embodiment, in the usage form in which the chassis members 12A and 12B are opened into the flat plate shape as illustrated in FIG. 6A, the axial center of each of the hinge shafts 36$a$ to 36$d$ is disposed on the same plane, and the surface of the display 16 is in agreement with the positions. When the chassis members 12A and 12B are operated so as to be folded from the usage form, the link members 30 and 31 rotate centering on the hinge shafts 36$a$ to 36$d$, so that the chassis members 12A and 12B are gradually folded and the display 16 is also bent as illustrated in FIG. 6B. Finally, the portable information device 10 is brought into a storage form in which the chassis members 12A and 12B are folded into the double-folded state and the display 16 is also folded into a double-folded state drawing an arc of a predetermined curvature as illustrated in FIG. 6C.

In the opening/closing operation, the surface 22$a$ of the first engagement piece 22 projecting from the inner end surface 18Aa abuts on the rear surface 18Bb of the second support plate 18B in the usage form illustrated in FIG. 6A, and separates from the rear surface 18Bb in the storage form illustrated in FIG. 6C. Similarly, the surface 23$a$ of the second engagement piece 23 projecting from the inner end surface 18Ba abuts on the rear surface 18Ab of the first support plate 18A in the usage form illustrated in FIG. 6A, and separates from the rear surface 18Ab in the storage form illustrated in FIG. 6C. More specifically, when the portable information device 10 is opened from the storage form illustrated in FIG. 6C to the usage form illustrated in FIG. 6A, each of the surfaces 22a and 23a of the engagement piece 22 and 23 abuts on the facing rear surfaces 18Bb and 18Ab of the support plates 18B and 18A from below to press the rear surfaces 18Bb and 18Ab in a direction of pressing up the rear surfaces 18Bb and 18Ab. As a result, the press-up force to the support plates 18B and 18A from the engagement pieces 22 and 23 regulates each other, so that the inner end surfaces 18Aa and 18Ba of the support plates 18A and 18B are flattened to be stabilized without generating a level difference in the plate thickness direction.

More specifically, the support plates 18A and 18B are separately configured so as to be double-foldable in connection with the opening/closing operation of the chassis members 12A and 12B. Therefore, when a level difference in the plate thickness direction is generated between the support plate 18A and 18B in the usage form, the level difference affects the display 16 provided on the surface thereof. As a result, there is a possibility that the display 16 is curved or waved to cause product defects, such as visual defects or display defects. Moreover, when the display 16 is curved or the like, there is a possibility that the display 16 is not movable on the opening/closing track in design in the opening/closing operation between the usage form and the storage form. Then, there is a concern that the display 16 receives an excessive load particularly in a bent portion and the neighborhood thereof to cause a breakage or a defect.

Then, the portable information device 10 has the inter-end surface positioning portion 24 in which the engagement pieces 22 and 23 projecting from the support plates 18A and 18B abut on the mating rear surfaces 18Bb and 18Ab to regulate each other to be balanced. Thus, the portable information device 10 can prevent the generation of a level difference between the inner end surface 18Aa and 18Ba of the support plates 18A and 18B in the usage form and can stably support the display 16. As a result, the display 16 is prevented from causing problems. The set of the first engagement piece 22 and the second engagement piece 23 may be at least one set.

In the portable information device 10, two or more of the engagement pieces 22 and 23 are alternately provided along the inner end surfaces 18Aa and 18Ba. Therefore, the generation of a level difference in the extension direction of the inner end surfaces 18Aa and 18Ba can be more certainly prevented.

In the portable information device 10, the attachment pieces 25 of the support plates 18A and 18B abut on and are supported by the surfaces 28Aa and 28Ba of the hinge chassis 28A and 28B, respectively. Therefore, in the portable information device 10, by arranging the surfaces 28Aa and 28Ba of the hinge chassis 28A and 28B on the same plane, for example, the generation of a level difference on both end portions in the Y direction of the inner end surfaces 18Aa and 18Ba of the support plates 18A and 18B can be prevented. As a result, the generation of a level difference between the inner end surfaces 18Aa and 18Ba can be more certainly prevented and the display 16 can be more stably supported in the usage form.

In the portable information device 10, with respect to the support plates 18A and 18B, the inner end surfaces 18Aa and 18Ba facing each other in the usage form in which the chassis members 12A and 12B are opened into the flat plate shape are disposed abutting on each other. Therefore, the support plates 18A and 18B are configured into one plate shape when opened. As a result, the display 16 is further stably supported. Moreover, the support plates 18A and 18B do not produce a gap between the inner end surfaces 18Aa and 18Ba in the usage form of the portable information device 10, and therefore the support rigidity to a touch operation of the display 16 and the like can also be secured.

Figure 7:
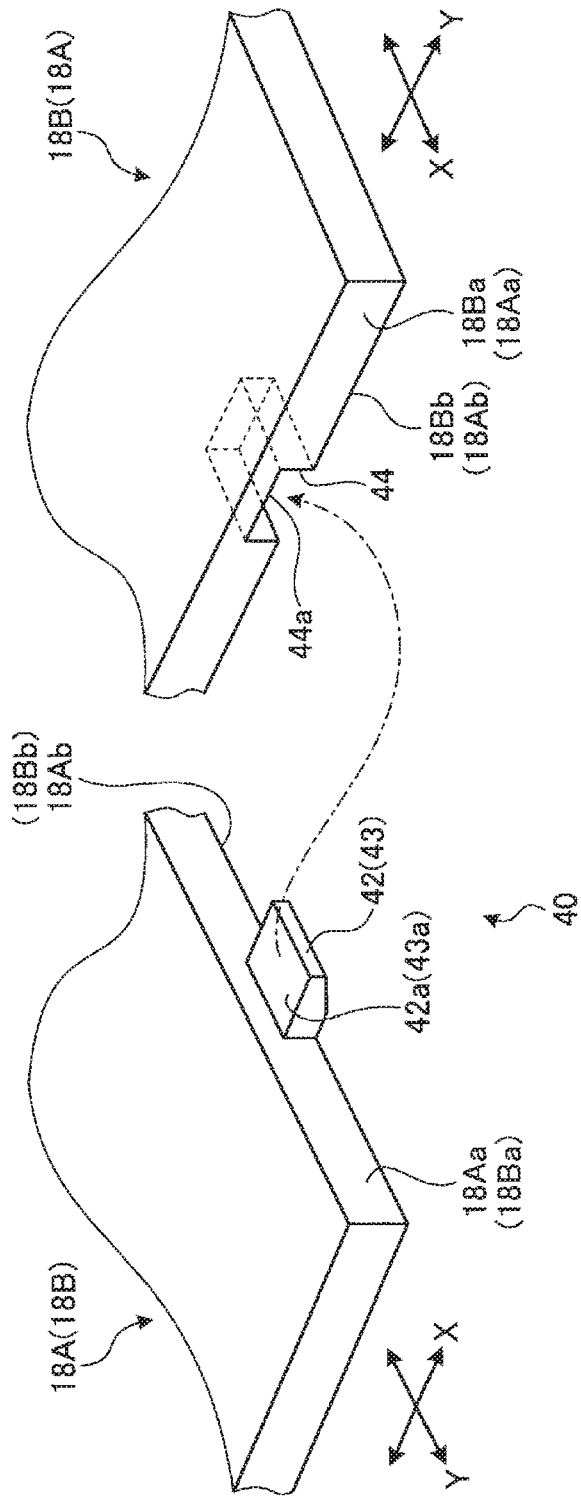
FIG. 7 is an enlarged perspective view of an essential portion schematically illustrating the configuration of an inter-end surface positioning portion according to a first modification.

FIG. 7 is an enlarged perspective view of an essential portion schematically illustrating the configuration of an inter-end surface positioning portion according to a first modification. FIG. 7 is an explanatory view in which the inner end surface 18Aa of the first support plate 18A and the inner end surface 18Ba of the second support plate 18B are developed into a fan shape as with FIG. 5 and the same applies to FIG. 8.

As illustrated in FIG. 7, the inter-end surface positioning portion 40 has a first engagement piece 42 and a second engagement piece 43 in place of the first engagement piece 22 and the second engagement piece 23 of the inter-end surface positioning portion 24 illustrated in FIG. 5.

The first engagement piece 42 is a plate piece-like member projecting from the inner end surface 18Aa of the first support plate 18A. The arrangement and the arrangement number of the first engagement pieces 42 may be the same as those of the first engagement pieces 22 illustrated in FIG. 3. The base end side of the first engagement piece 42 is integrally formed with the inner end surface 18Aa or fixed to the inner end surface 18Aa using an engagement structure, for example. The tip end side of the first engagement piece 42 projects in an X2 direction straddling the inner end surfaces 18Aa and 18Ba to extend to a position where the tip end side of the first engagement piece 42 can be inserted into/removed from a recessed portion 44 formed in the rear surface 18Bb of the second support plate 18B. The recessed portion 44 is formed in the rear surface 18Bb and the inner end surface 18Ba and a lower portion are opened. Thus, when the chassis members 12A and 12B are opened/closed, the surface 42a on the tip side projecting from the inner end surface 18Aa of the first engagement piece 42 contacts/separates from the bottom surface (top surface) 44a of the recessed portion 44 from the rear surface 18Bb side.

The second engagement piece 43 has the same configuration as that of the first engagement pieces 42 except being provided in the second support plate 18B and disposed in parallel alternately with the first engagement piece 42. Then, detailed drawings and descriptions of the second engagement piece 43 and the surface 43a are omitted by illustrating the reference numerals of the second engagement piece 43 and the surface 43a thereof in the brackets together with the reference numerals of the first engagement piece 42 and the surface 42a thereof in FIG. 7. More specifically, when the chassis members 12A and 12B are opened/closed, the surface 43a on the tip side projecting from the inner end surface 18Ba of the second engagement piece 43 contacts/separates from the bottom surface (top surface) 44a of the recessed portion 44 formed in the rear surface 18Ab of the first support plate 18A from the rear surface 18Ab side.

In the inter-end surface positioning portion 40, the thickness of each of the engagement pieces 42 and 43 does not appear on the side of the rear surfaces 18Ab and 18Bb of the support plates 18A and 18B as compared with that of the inter-end surface positioning portion 24 illustrated in FIG. 5. Therefore, the thickness of the support plates 18A and 18B including the engagement pieces 42 and 43 can be reduced. The recessed portion 44 may be utilized as abutment portions of the engagement pieces 22 and 23 of the inter-end surface positioning portion 24 illustrated in FIG. 5.

Figure 8:
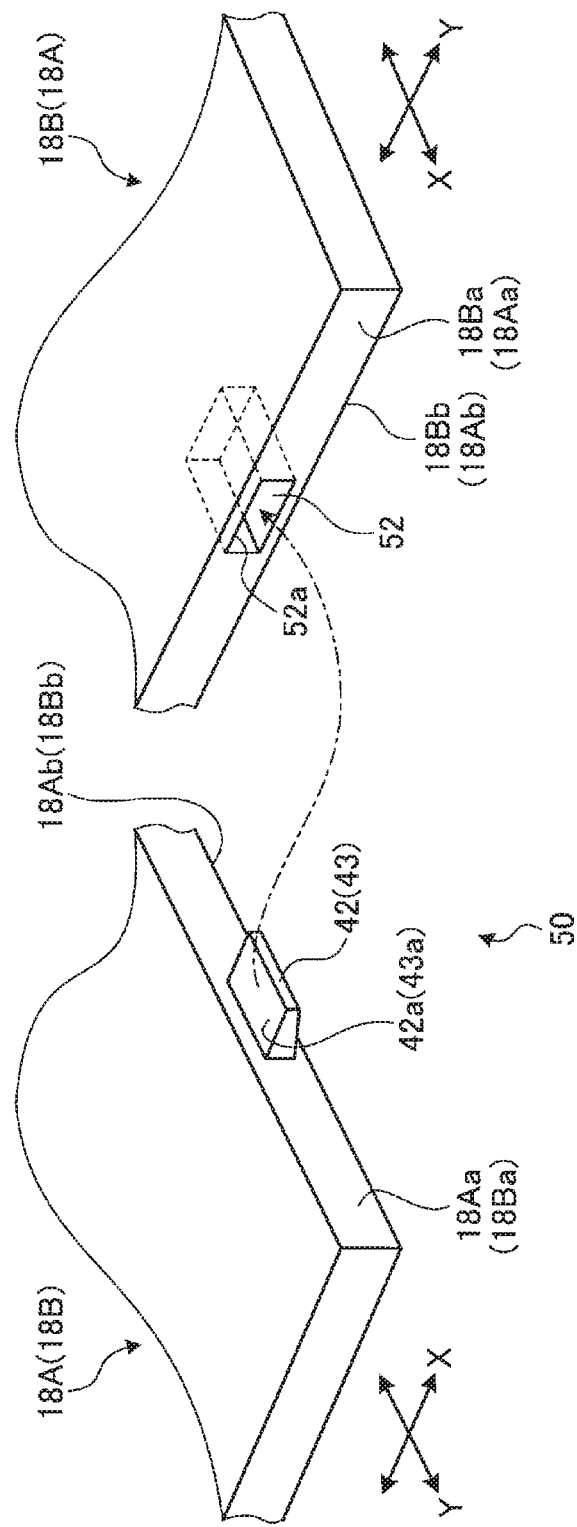
FIG. 8 is an enlarged perspective view of an essential portion schematically illustrating the configuration of an inter-end surface positioning portion according to a second modification.

FIG. 8 is an enlarged perspective view of an essential portion schematically illustrating the configuration of an inter-end surface positioning portion 50 according to a second modification.

As illustrated in FIG. 8, the inter-end surface positioning portion 50 has a hole portion 52 in place of the recessed portion 44 of the inter-end surface positioning portion 40 illustrated in FIG. 7. The engagement pieces 42 and 43 of the inter-end surface positioning portion 50 may have the same structure as that of the engagement pieces 42 and 43 of the inter-end surface positioning portion 40 illustrated in FIG. 7 but, in the configuration example illustrated in FIG. 8, the projection length is shortened and the positions in the plate thickness direction of the inner end surfaces 18Aa and 18Ba are shifted upward. The hole portion 52 is opened and formed in the inner end surface 18Aa or 18Ba of the support plate 18A or 18B and has a depth in the X direction. Thus, the tip side projecting from the inner end surface 18Aa of the engagement piece 42 (43) of the inter-end surface positioning portion 50 is inserted into/removed from the hole portion 52 when the chassis members 12A and 12B are opened/closed and the surface 42a (43a) thereof contacts/separates from a top surface 52a of the hole portion 52 from the rear surface 18Bb or 18Ab side.

Also in such an inter-end surface positioning portion 50, the thickness of the support plates 18A and 18B including the engagement pieces 42 and 43 can be reduced as with the inter-end surface positioning portion 40 illustrated in FIG. 7. The portable information device 10 of this embodiment employs the hinge mechanism 19 of moving the inner end surfaces 18Aa and 18Ba of the support plates 18A and 18B abutting on each other on the movement track of the substantially U-shape while separating the same in the X direction as illustrated in FIG. 6A. Therefore, the engagement pieces 42 and 43 are smoothly inserted into/removed from the hole portion 52 opened in the facing inner end surfaces 18Ba and 18Aa.

It is a matter of course that the present invention is not limited to the embodiments described above and can be freely altered without deviating from the scope of the present invention.

The invention claimed is:

1. A portable information device comprising:
    a first chassis member and a second chassis member which are foldable into a double-folded state;
    a display over inner surfaces of the first chassis member and the second chassis member and which is foldable into a double-folded state;
    a first support plate on an inner surface side of the first chassis member and supports a rear surface of the display on a side of the first chassis member;
    a second support plate on an inner surface side of the second chassis member and supports a rear surface of the display on a side of the second chassis member;
    a first engagement piece in the first support plate, projects from one end surface side of the first support plate, and contacts/separates from the second support plate when the first chassis member and the second chassis member are opened/closed; and
    a second engagement piece in the second support plate, projects from one end surface side of the second support plate, and contacts/separates from the first support plate when the first chassis member and the second chassis member are opened/closed.

2. The portable information device according to claim 1, wherein:
    at least two of the first engagement pieces are along one end surface of the first support plate, and
    at least two of the second engagement pieces are along one end surface of the second support plate at positions where the first engagement pieces and the second engagement pieces alternately face each other.

3. The portable information device according to claim 1, wherein:
    a base end side of the first engagement piece is on a rear surface side of the first support plate,
    a base end side of the second engagement piece is on a rear surface side of the second support plate, and
    when the first chassis member and the second chassis member are opened into a flat plate shape, a surface on a tip end side of the first engagement piece abuts on a rear surface of the second support plate or a bottom surface of a recessed portion formed in the rear surface, and a surface on a tip end side of the second engagement piece abuts on a rear surface of the first support plate or a bottom surface of a recessed portion formed in the rear surface.

4. The portable information device according to claim 1, wherein:
    the first engagement piece projects from one end surface of the first support plate,
    the second engagement piece projects from one end surface of the second support plate, and
    when the first chassis member and the second chassis member are opened into a flat plate shape, a surface on a tip end side of the first engagement piece abuts on a bottom surface of a recessed portion formed in a rear surface of the second support plate or a top surface of a hole portion opened and formed in one end surface of the second support plate, and a surface on a tip end side of the second engagement piece abuts on a bottom surface of a recessed portion formed in a rear surface of the first support plate or a top surface of a hole portion opened and formed in one end surface of the first support plate.

5. The portable information device according to claim 1, wherein:
    when the first chassis member and the second chassis member are opened into the flat plate shape, the one end surface of the first support plate is abutting on the one end surface of the second support plate.

6. The portable information device according to claim 1, wherein:
    the first chassis member and the second chassis member are foldable into a double-folded state by connection of a pair of edge portions disposed adjacent to each other by a hinge mechanism, and
    the hinge mechanism has:
        a first hinge chassis fixed to an inner surface of the first chassis member and on a surface of which the first support plate is supported;
        a second hinge chassis fixed to an inner surface of the second chassis member and on a surface of which the second support plate is supported; and
        a hinge shaft rotatably connecting the first hinge chassis and the second hinge chassis.

7. The portable information device according to claim 1, wherein:
    the first chassis member and the second chassis member are foldable into a double-folded state by connection of a pair of edge portions disposed adjacent to each other by a hinge mechanism, and the hinge mechanism has:
- a first link member and a second link member between inner surfaces of the first chassis member and the second chassis member,
- one end side of the first link member is rotatably connected to the first chassis member through a first hinge shaft, and another end side of the first link member is rotatably connected to the second chassis member through a second hinge shaft,
- one end side of the second first link member is rotatably connected to the first chassis member through a third hinge shaft, and another end side of the second first link member is rotatably connected to the second chassis member through a fourth hinge shaft, and
- the first hinge shaft, the second hinge shaft, the third hinge shaft, and the fourth hinge shaft are disposed side by side in an order of the first hinge shaft, the third hinge shaft, the second hinge shaft, and the fourth hinge shaft in a direction from the first chassis member to the second chassis member.

* * * * *